US008308435B2

(12) United States Patent
Storace et al.

(10) Patent No.: US 8,308,435 B2
(45) Date of Patent: Nov. 13, 2012

(54) METHODS AND SYSTEM FOR BALANCING TURBINE ROTOR ASSEMBLIES

(75) Inventors: Albert Frank Storace, Cincinnati, OH (US); Ian Francis Prentice, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 1168 days.

(21) Appl. No.: 11/965,042

(22) Filed: Dec. 27, 2007

(65) Prior Publication Data

US 2009/0169384 A1    Jul. 2, 2009

(51) Int. Cl.
 *F01D 25/04*    (2006.01)
(52) U.S. Cl. .......................................... 416/145; 73/470
(58) Field of Classification Search .................. 416/144, 416/145; 73/458, 470, 457, 468, 455, 460
See application file for complete search history.

(56) References Cited

U.S. PATENT DOCUMENTS

| | | | |
|---|---|---|---|
| 3,952,612 A * | 4/1976 | Kurkowski et al. ........... 416/145 |
| 5,676,025 A * | 10/1997 | Lulay ............................... 73/470 |
| 6,259,372 B1 | 7/2001 | Taranowski et al. |
| 6,343,251 B1 | 1/2002 | Herron et al. |
| 7,118,338 B2 | 10/2006 | Moroz et al. |
| 7,142,990 B2 | 11/2006 | Bouse et al. |
| 7,155,973 B2 | 1/2007 | Dyer |
| 7,231,180 B2 | 6/2007 | Benson et al. |
| 7,321,809 B2 | 1/2008 | Vian et al. |
| 2005/0160811 A1 * | 7/2005 | Dyer ................................ 73/462 |
| 2006/0178780 A1 * | 8/2006 | Justak et al. .................. 700/279 |
| 2007/0227246 A1 | 10/2007 | Vian et al. |

FOREIGN PATENT DOCUMENTS

DE   867956   2/1953
SU   1682846 A1 * 10/1991

OTHER PUBLICATIONS

SU 19911007 A1 English Translation. Schreiber Translations, Inc. Oct. 2011.*
International Search Report, PCT/US2008/086009, dated May 18, 2009, pp. 3.

* cited by examiner

*Primary Examiner* — Richard Edgar
(74) *Attorney, Agent, or Firm* — General Electric Company; David J. Clement; William Scott Andes

(57) ABSTRACT

A balancing system and method for reducing imbalance in a rotatable member of a machine is provided. The system includes a plurality of vibration sensors positioned about a stationary portion of the machine, a controller assembly communitively coupled to the plurality of vibration sensors, and a balancing assembly coupled to the rotatable member, said balancing assembly configured to wirelessly communicate with said controller assembly, said balancing assembly configured to modify the weight distribution of the rotatable member in response to a command wirelessly transmitted from the controller assembly. The controller assembly is configured to receive data from the plurality of vibration sensors and determine an imbalance in the rotatable member using the received data.

19 Claims, 5 Drawing Sheets

METHODS AND SYSTEM FOR BALANCING TURBINE ROTOR ASSEMBLIES

BACKGROUND OF THE INVENTION

The field of the invention relates generally to rotary blade systems, and more specifically, to methods and system for wirelessly balancing rotor assemblies.

Known gas turbine engines include rotor assemblies that are rotatable relative to stationary engine structures. Known rotor assemblies include a number of rotatable components including a central shaft, shaft cones, compressor blades and disks, turbine buckets and wheels, and/or dynamic air seals. Each component is acted upon by static and/or dynamic axial pressure forces. Rotor imbalance may be a common source of vibration in known rotor assemblies. An imbalance in rotary machinery may be evident if the mass axis of a rotating disk or shaft does not substantially coincide with the axis of rotation. In such operating conditions, the rotating shaft or disk rotates about its axis and generates a centrifugal force that is substantially distributed to the bearings and support structure. The centrifugal force may induce a vibrational frequency to the non-rotating structure that is synchronous with rotor speed. The resulting dynamic response of the rotor/stator system may cause amplitudes of motion or may lead to failure of the rotor, bearings, and/or the support structure.

To reduce the effects of imbalances, at least some known turbofan engines are manually balanced. In such a process, the fan assembly is balanced by coupling weights in the fan spinner or an adjacent rotating structure in an attempt to counter the rotor imbalance and to reduce the forced response of the system to acceptable levels. Vibration measurements are taken and used to calculate the distribution (amplitude and phase) of the corrective weights to be installed. The engine is then stopped and the appropriate weight(s) are added to the appropriate rotor assembly component. The engine is then cycled over its full rotor operating range to determine if the corrective weights reduced the vibration levels to acceptable levels. If the vibration levels are not acceptable, the process is repeated until acceptable vibration levels are achieved. Such a balancing procedure may be a time-consuming process that may require cycling the engine through its full rotor operating range several times. Additionally, balancing the fan assembly in this manner requires experienced technicians, expends significant quantities of fuel, and may result in an increase of environmentally undesirable emissions based on the increased engine running time.

BRIEF DESCRIPTION OF THE INVENTION

In one aspect, a balancing system for reducing imbalance in a rotatable member of a machine is provided. The system includes a plurality of vibration sensors positioned to sense vibrations of the rotatable member, a controller assembly communitively coupled to the plurality of vibration sensors, and a balancing assembly coupled to the rotatable member, said balancing assembly configured to wirelessly communicate with said controller assembly, said balancing assembly configured to modify the weight distribution of the rotatable member in response to a command transmitted from the controller assembly. The controller assembly is configured to receive data from the plurality of vibration sensors and determine an imbalance in the rotatable member based on the received data.

In another aspect, a method for balancing a rotor in a gas turbine engine is provided. The method includes coupling a balancing assembly to the rotor, measuring an imbalance of the rotor, determining a force vector that facilitates reducing the determined imbalance, transmitting, wirelessly, a movement command to the balancing assembly, and modifying a weight distribution of the balancing assembly using the movement command.

In yet another aspect, a balancing assembly rotatably coupled to a gas turbine engine rotor is provided. The assembly includes a first balancing member rotatably coupled to the rotor, a second balancing member, wherein the first balancing member is positioned radially outward from the second balancing member, and at least one bearing configured to support at least one of said first and second balancing members.

DETAILED DESCRIPTION OF THE INVENTION

Figure 1:
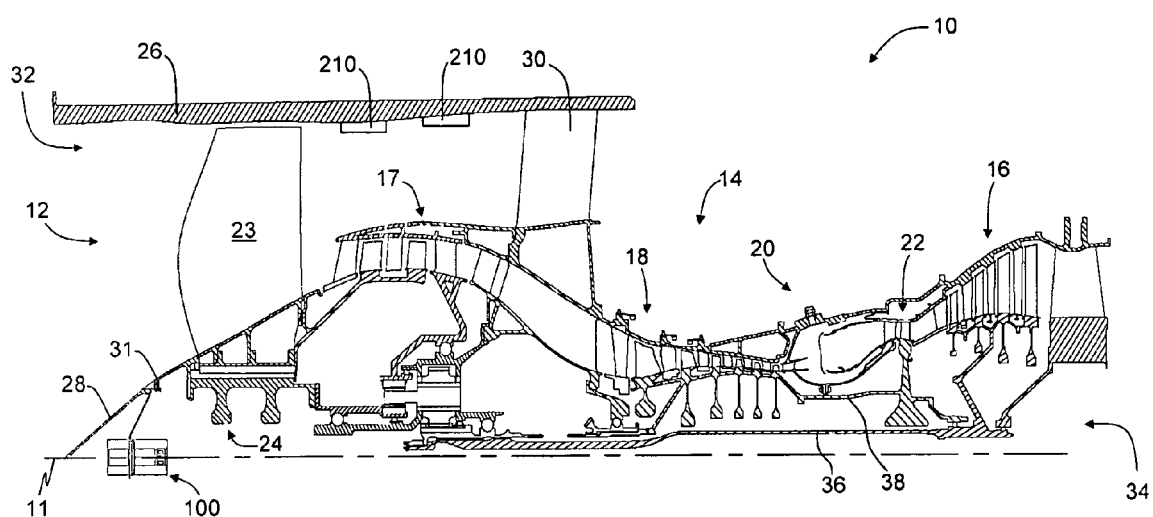
FIG. 1 is a cross-sectional view of an exemplary turbofan engine assembly including a balancing assembly.

FIG. 1 illustrates an exemplary gas turbine engine 10 having a longitudinal axis 11. Engine 10 includes a fan assembly 12, a core gas turbine engine section 14 coupled downstream from fan assembly 12, and a low-pressure turbine 16 coupled downstream from the core gas turbine engine section 14. In the exemplary embodiment, core gas turbine engine section 14 includes a multi-stage booster compressor 17, a high-pressure compressor 18, a combustor 20, and a high-pressure turbine 22. Fan assembly 12 includes a plurality of fan blades 23 that extend radially outward from a rotor disk 24, a fan shroud 26, a fan spinner 28, and a plurality of circumferentially spaced outlet guide vanes 30 that support fan shroud 26. Fan spinner 28 is coupled to a spinner support bracket 31. Engine 10 also includes an inlet 32 and an exhaust 34. In the exemplary embodiment, low-pressure turbine 16 and booster compressor 17 are coupled together via a first drive shaft 36, and compressor 18 and high-pressure turbine 22 are coupled together via a second drive shaft 38.

In operation, air is drawn into engine inlet 32, and compressed through booster compressor 17 and high pressure compressor 18. Compressed air is channeled to combustor 20 wherein it is mixed with fuel and ignited to produce air flow through high pressure turbine 22 and low pressure turbine 16, and exits through exhaust 34.

Figure 2:
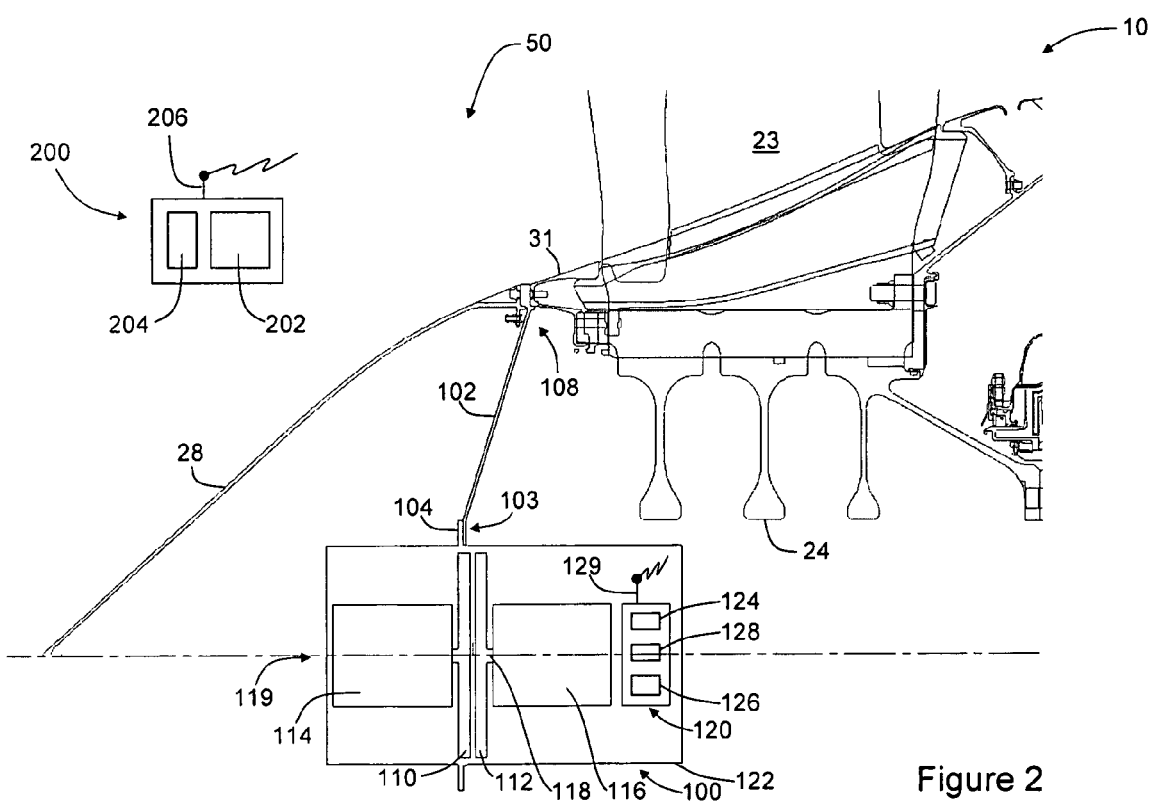
FIG. 2 is an exemplary cross-sectional schematic view of an exemplary balancing assembly used with the turbofan engine assembly shown in FIG. 1.

FIG. 2 is an enlarged cross-sectional schematic view of an a balancing system 50 used with engine 10. In the exemplary embodiment, balancing system 50 includes a balancing assembly 100 that is removably coupled within engine 10 by at least two support members 102. More specifically, in the exemplary embodiment, support members 102 are coupled at a first end 103 to a balancing assembly flange 104 and at a second end 108 between fan spinner 28 and spinner support bracket 31. Support members 102 may be coupled to assembly 100 by any coupling method, for example, by welding, or any other method that enables assembly 100 to function as described herein. In another embodiment, balancing assembly 100 may be integrally formed with, or permanently coupled, to fan spinner 28 such that fan spinner 28 and balancing assembly 100 may be removed and/or installed within engine 10 as a single unit.

In the exemplary embodiment, balancing assembly 100 includes two rotatable balancing members 110 and 112. Balancing member 110 is rotated by a first motor 114 and balancing member 112 is rotated by a second motor 116. Both balancing members 110 and 112 are oriented substantially concentrically along a central rotor 118 having a center axis 119. Balancing assembly 100 also includes an internal control assembly 120. Control assembly 120, balancing members 110 and 112, and motors 114 and 116 are housed in a housing 122. In the exemplary embodiment, motors 114 and 116 are stepper motors. Alternatively, motors 114 and 116 may be any power source that enables balancing assembly 100 to function as described herein. Additionally, internal control assembly 120 includes a transceiver 124, a processor 126, a power source 128, and an antenna 129. During use, and as described in more detail below, control assembly 120 regulates balancing assembly 100.

Additionally, balancing system 50 also includes a controller assembly 200 that includes a processor 202, a transceiver 204 and an antenna 206. In the exemplary embodiment, controller assembly 200 is coupled in communication with a plurality of vibration sensors 210 (shown in FIG. 1) coupled within engine 10. Controller assembly 200 is also coupled in wireless communication with balancing assembly internal control assembly 120. In operation, controller assembly 200 issues commands balancing assembly internal control assembly 120 to facilitate rotating balancing members 110 and 112 in the calculation of a balancing solution described in more detail below. In the exemplary embodiment, controller assembly 200 and internal control assembly 120 form a closed loop system, such that upon a command being sent from controller assembly 200 to internal control assembly 120, internal control assembly 120 transmits a position response back to controller assembly 200. In the alternative embodiment, controller assembly 200 and internal control assembly 120 form an open loop system, such that controller assembly 200 relies solely on input from vibration sensors 210 positioned about engine 10 and transmits commands to internal control assembly 120 in an iterative fashion.

Figure 3:
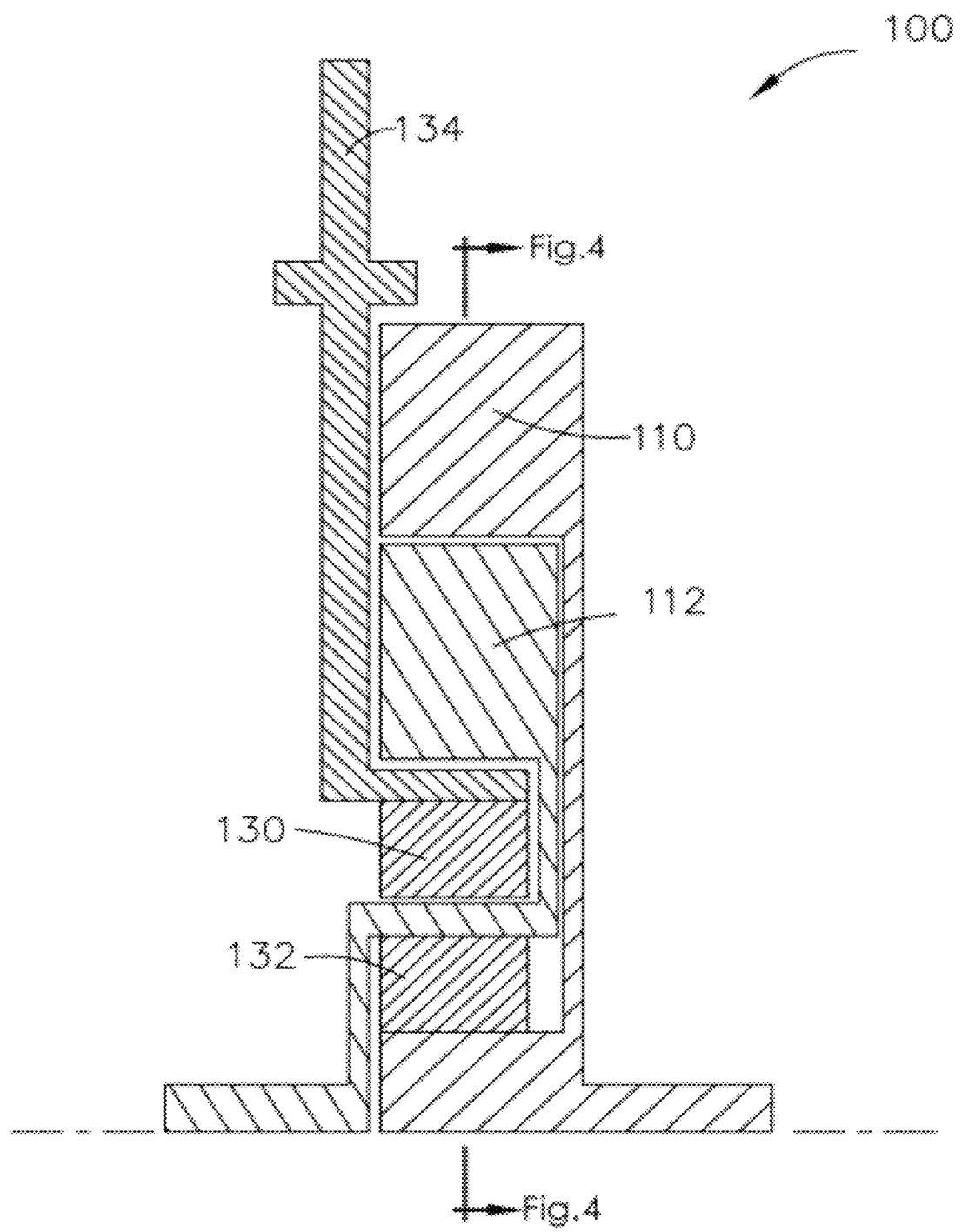
FIG. 3 is a cross-sectional schematic view of a portion of balancing assembly shown in FIG. 2.

FIG. 3 is a cross-sectional view of balancing assembly 100 and illustrates the orientation of balancing members 110 and 112. In the exemplary embodiment, balancing members 110 and 112 are substantially concentrically aligned and each has a radially eccentric weight distribution, as described below. Members 110 and 112 are oriented such that balancing member 110 is radially outward from balancing member 112 when assembly 100 is coupled within engine 10. A plurality of bearing assemblies 130 and 132 provide support and stability to members 110 and 112, respectfully. In the exemplary embodiment, bearing assemblies 130 and 132 also provide radial support to balancing assembly 100. An internal support 134 extends substantially perpendicularly inward from assembly housing 122 (shown in FIG. 2) to facilitate providing additional axial and radial support to assembly 100. Moreover, in the exemplary embodiment, members 110 and 112 and bearing assemblies 130 and 132 are oriented in the same axial plane such that bearing assembly 130 provides rotational support between internal support 134 and balancing member 112, and such that bearing assembly 132 provides rotational support between balancing member 110 and balancing member 112. Alternatively, members 110 and 112 and bearing assemblies 130 and 132 may be oriented in any configuration that enables balancing assembly 100 to function as described herein.

Figure 4:
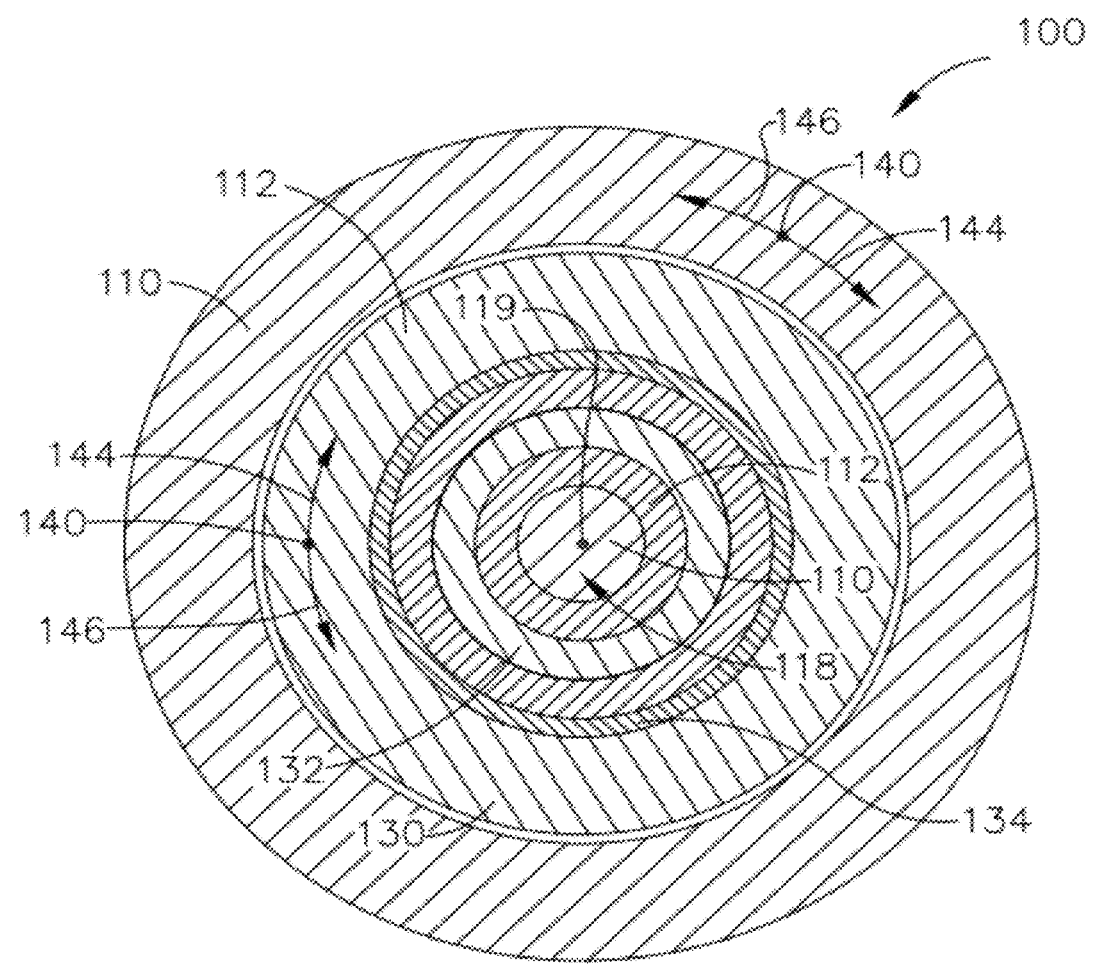
FIG. 4 is a cross-sectional end view of the balancing assembly shown in FIG. 3 and taken along line 4-4.

FIG. 4 illustrates a cross-sectional end view of balancing assembly 100. In the exemplary embodiment, balancing member 110 has an eccentrically offset center of mass 140. Similarly, balancing member 112 has an eccentrically offset center of mass 142. Each member 110 and 112 is rotatably coupled about rotor 118 and center axis 119 such that members 110 and 112 can rotate in a clockwise direction 144 or a counter-clockwise direction 146. Alternatively, balancing members 110 and 112 and bearing assemblies 130 and 132 may be coupled within balancing assembly 100 in any configuration that enables system 50 to function as described herein.

During engine operation, system 50 uses wireless communications to automatically determine a balance solution for engine 10. Balancing assembly 100 is coupled to rotor 118 as described herein, and vibration sensors 210 are positioned about engine 10. In the exemplary embodiment, sensors 210 include accelerometers, and a key phasor (not shown) used to determine a rotational position of fan assembly 12. The key phasor is used to establish a phase reference relative to fan spinner 28 and to calibrate the signals from vibration sensors 210.

Figure 6:
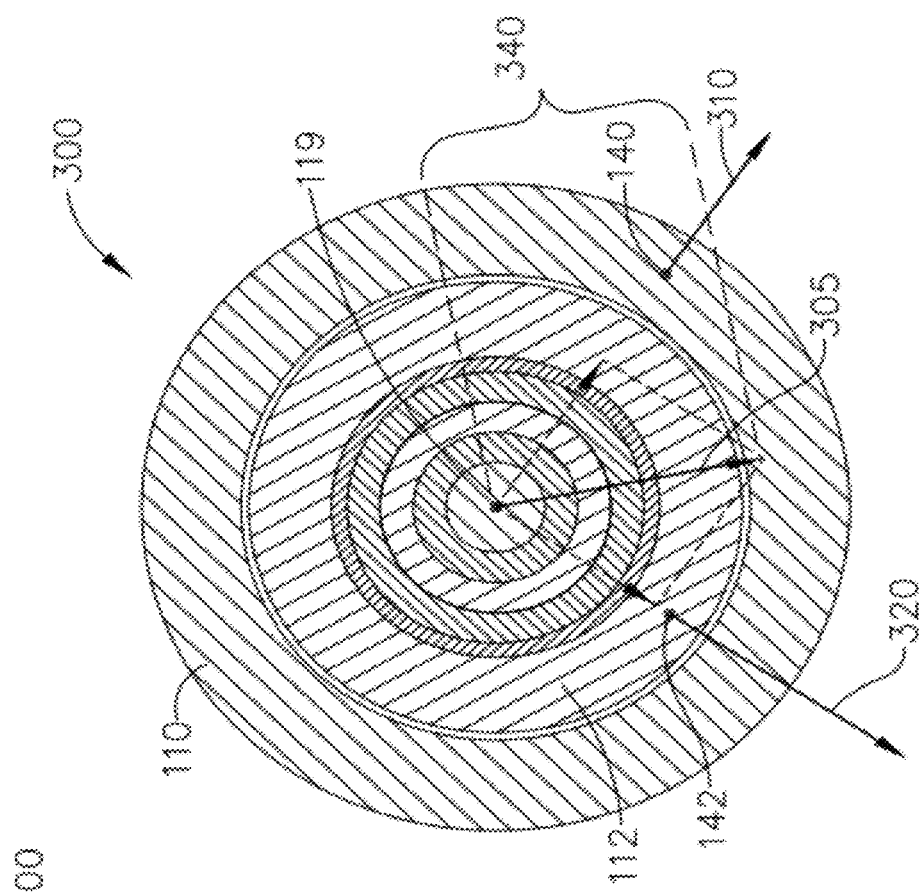
FIG. 6 is a cross-sectional end view of the balancing assembly shown in FIG. 3 and taken along line 4-4 and illustrates exemplary force vectors associated with the balancing assembly following a balancing iteration.
Figure 5:
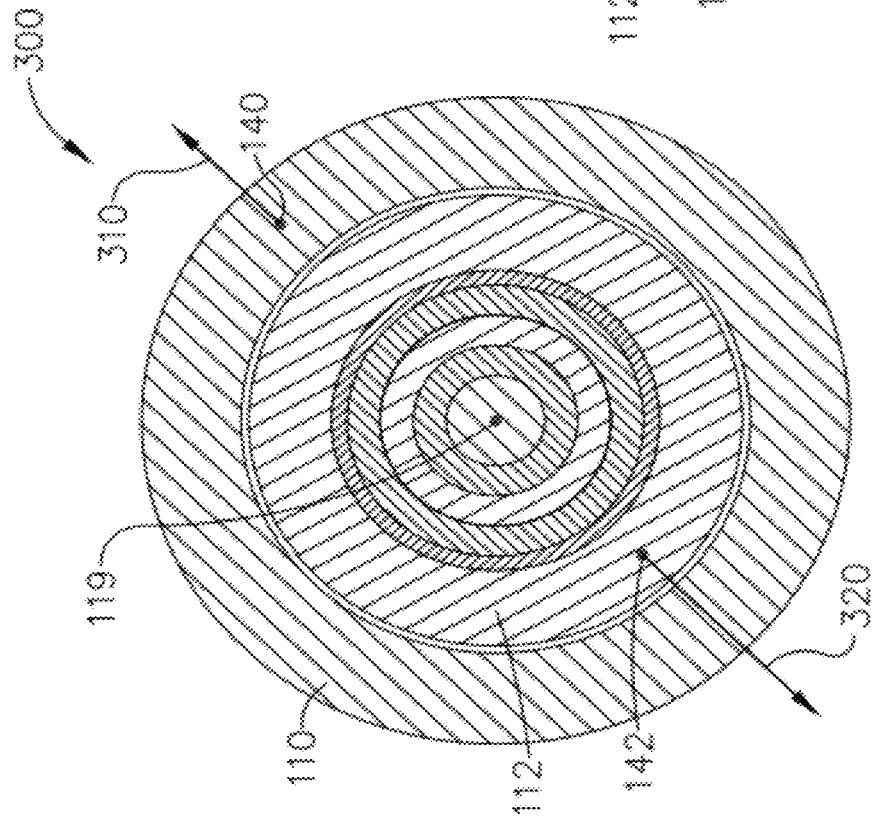
FIG. 5 is a cross-sectional end view of the balancing assembly shown in FIG. 3 and taken along line 4-4 and illustrates exemplary force vectors associated with the balancing assembly.

FIGS. 5 and 6 illustrate a cross-sectional end view of balancing assembly 300 and illustrate exemplary force vectors associated with balancing assembly 300. Balancing assembly 300 is substantially similar to balancing assembly 100 (shown in FIGS. 1-4) and components in balancing assembly 300 that are identical to components of balancing assembly 100 are identified in FIGS. 5 and 6 using the same reference numerals used in FIGS. 1-5. Accordingly, balancing assembly 300 includes balancing members 110 and 112 and respective centers of mass 140 and 142 oriented about a center axis 119.

In the exemplary embodiment, centers of mass 140 and 142 of each respective balancing member 110 and 112 are oriented 180° apart at the beginning of the balancing process, as shown in FIG. 5. Alternatively, centers of mass 140 and 142 of each respective balancing member 110 and 112 may be positioned at any angular location that enables balancing assembly 300 to function as described herein. Balancing assembly 300 has an exemplary force vector 305, and each balancing member 110 and 112 has a force vector 310 and 320, respectively. In the exemplary embodiment, force vectors 310 and 320 are equivalent, and each balancing member 110 and 112 has a differing mass. Alternatively, each balancing member 110 and 112 mass and respective force vector 310 and 320 are of a magnitude that enables balancing assembly 300 to function as described herein.

Vibration signals sent to the controller assembly 200 are filtered by processor 202 to obtain the rotor-speed frequency components. Upon sensing vibration, vibration sensors 210 transmit a signal to controller assembly 200, which is received by transceiver 204 located therein. Controller assembly processor 202 generates a command signal based on vibration data received from sensors 210, and transmits the command signal to balancing assembly receiver 124. Activation of motors 114 and 116 is controlled by commands from controller assembly 200.

FIG. 6 illustrates a cross-sectional end view of balancing assembly 300 and illustrates exemplary force vectors associated with balancing assembly 300 following a balancing iteration. More specifically and in the exemplary embodiment, motors 114 and 116 rotate balancing members 110 and 112 to cause the center of mass 140 and 142 of each respective balancing member 110 and 112 to be oriented at a determined angle with respect to fan spinner 28. Balancing members 110 and 112 are adjusted to facilitate producing resultant force vector 305, and thus facilitate minimizing vibration levels measured by sensors 210. Resultant force vector 305 is again determined via known vector summation 340 for balancing assembly 300 following the exemplary balancing process iteration.

In the exemplary embodiment, the controller assembly 200 uses a least-squares method algorithm for computing a balance solution. To calculate the balance solution the algorithm uses plain least squares to facilitate minimizing residual vibration levels at the vibration sensors, and then iterates, using weighted least squares, to facilitate reducing the maximum residual vibration in light of the vibration response from multiple sensors over a range of operating rotor speeds. Alternatively, the balance solution may be calculated by any method that enables balancing assembly 300 to function as described herein.

In the exemplary embodiment, following an iteration that produces an acceptable vibration level, the controller assembly processor 202 outputs a final balance solution that includes a quantity of balancing weight to be installed and a relative angular position for the installation of the balancing weight relative to the fan spinner, or any rotating engine structure that facilitates reducing the vibration level. At this time, balancing assembly is removed from engine 10 and the appropriate balancing weight is positioned within engine 10 at the determined relative angular position.

The above-described systems and methods facilitate automatic balancing of a rotor assembly in a gas turbine engine using an autobalancer that provides an automated means to quickly determine the balance solution for the fan without user intervention and without having to stop and start the engine for multiple vibration measurement and balance shot iterations. Furthermore, this automatic balancing system provides an opportunity to achieve significant fuel and labor cost savings and to significantly reduce $CO_2$ emissions based on decreased engine running time. As a result, the above-mentioned balancing system facilitates providing a balance solution for the rotor assembly without the need to stop and restart the engine over multiple balancing iterations.

Although the systems and methods described herein are described in the context of a balancing assembly for gas turbine engine rotors, it is understood that the systems and methods are not limited to such balancing assemblies. Likewise, the system components illustrated are not limited to the specific embodiments described herein, but rather, system components can be utilized independently and separately from other components described herein.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

While the invention has been described in terms of various specific embodiments, those skilled in the art will recognize that the invention can be practiced with modification within the spirit and scope of the claims.

What is claimed is:

1. A balancing system for use in balancing a rotatable member, said system comprising:
 a plurality of vibration sensors positioned to sense vibrations of the rotatable member;
 a controller assembly communitively coupled to said plurality of vibration sensors, said controller assembly configured to:
  receive data from said plurality of vibration sensors; and
  determine an imbalance in the rotatable member based on the received data; and
 a balancing assembly coupled to the rotatable member, wherein said balancing assembly comprises:
  a transceiver configured to wirelessly communicate with said controller assembly to modify a weight distribution of the rotatable member in response to a command transmitted from said controller assembly;
  a first balancing member coupled to the rotatable member through a first bearing assembly, said first bearing assembly positioned radially inward from a center of mass of said first balancing member, said first balancing member comprising a radially eccentric weight distribution; and
  a second balancing member coupled to the rotatable member through a second bearing assembly, said second balancing member comprising a radially eccentric weight distribution, said second balancing member positioned substantially radially inward from said first balancing member, said second balancing member co-aligned along an axis of rotation of the rotatable member with said first balancing member, said first bearing assembly positioned radially inward from said second bearing assembly, the center of mass of said first balancing member and a center of mass of said second balancing member.

2. A balancing system in accordance with claim 1, wherein said controller assembly and said balancing assembly form a closed loop system.

3. A balancing system in accordance with claim 1, wherein said balancing assembly further comprises a stepper motor configured to wirelessly communicate with said controller assembly, said stepper motor configured to adjust a position of at least one of said first balancing member and said second balancing member in response to a command wirelessly transmitted from said controller assembly.

4. A balancing system in accordance with claim 3, wherein said controller assembly further comprises:
 a processor configured to generate a command signal to control a position of at least one of said first balancing member and said second balancing member; and
 a transmitter communicatively coupled to said processor.

5. A balancing system in accordance with claim 1, wherein said first and second balancing members are supported by bearings that are aligned substantially co-planarly along a longitudinal axis of the rotatable member with respect to each other.

6. A balancing system in accordance with claim 1, wherein said plurality of sensors are configured to determine a rotational position of the rotatable member.

7. A method for balancing a rotor in a gas turbine engine, said method comprising:
 coupling a balancing assembly to the rotor, wherein the balancing assembly comprises:
  a first balancing member coupled to the rotor through a first bearing assembly, the first bearing assembly positioned radially inward from a center of mass of the first balancing member, the first balancing member comprising a radially eccentric weight distribution; and a second balancing member coupled to the rotor through a second bearing assembly, the second balancing member comprising a radially eccentric weight distribution, wherein the second balancing member is substantially radially inward from the first balancing member, wherein the second balancing member is co-aligned along an axis of rotation of the rotor with the first balancing member, and wherein the first bearing assembly is positioned radially inward from the second bearing assembly, the center of mass of the first balancing member, and a center of mass of the second balancing member;

measuring an imbalance of the rotor;

determining a force vector that facilitates reducing the determined imbalance;

transmitting, wirelessly, a movement command to at least one of the first and second balancing members of the balancing assembly; and modifying a weight distribution of the balancing assembly using the movement command, wherein the modified weight distribution facilitates reducing the imbalance of the rotor.

8. A method in accordance with claim 7, further comprising outputting a balance solution to a display, wherein the balance solution includes an amount of balance weight and a relative angular position for the installation of the balance weight.

9. A method in accordance with claim 8, further comprising coupling the balance weight to the rotor at the relative angular position.

10. A method in accordance with claim 7, wherein measuring an imbalance further comprises;

determining the angular position of the rotatable member;

receiving data from a plurality of vibration sensors; and determining an imbalance in the rotatable member based on the received data.

11. A method in accordance with claim 7, wherein determining a force vector further comprises generating a command signal to control a position of the balancing assembly.

12. A method in accordance with claim 7, wherein transmitting a movement command further comprises transmitting the movement command to a transceiver coupled to the balancing assembly.

13. A method in accordance with claim 7, wherein modifying a weight distribution further comprises rotating at least one of the first and second balancing members with respect to the at least one of the rotor and other balancing member.

14. A balancing assembly rotatably coupled to a gas turbine engine rotor, said assembly comprising:

a first balancing member rotatably coupled to the rotor through a first bearing assembly, said first bearing assembly positioned radially inward from a center of mass of said first balancing member; and a second balancing member rotatably coupled to the rotor through a second bearing assembly, said first balancing member is radially outward from said second balancing member, said second balancing member co-aligned along an axis of rotation of the rotor with said first balancing member, said first bearing assembly positioned radially inward from said second bearing assembly, the center of mass of said first balancing member, and a center of mass of said second balancing member.

15. A balancing assembly in accordance with claim 14, further comprising at least one receiver configured to wirelessly communicate with a controller assembly, said at least one receiver facilitates rotationally positioning at least one of said first and second balancing members.

16. A balancing assembly in accordance with claim 15, wherein said at least one receiver comprises a stepper motor.

17. A balancing assembly in accordance with claim 14, further comprising a housing configured to protect said assembly during operation.

18. A balancing assembly in accordance with claim 14, wherein said first and second balancing members are aligned substantially co-axially with respect to each other.

19. A balancing assembly in accordance with claim 14, wherein said first and second balancing members comprise a radially eccentric weight distribution.

\* \* \* \* \*